Figure 1:
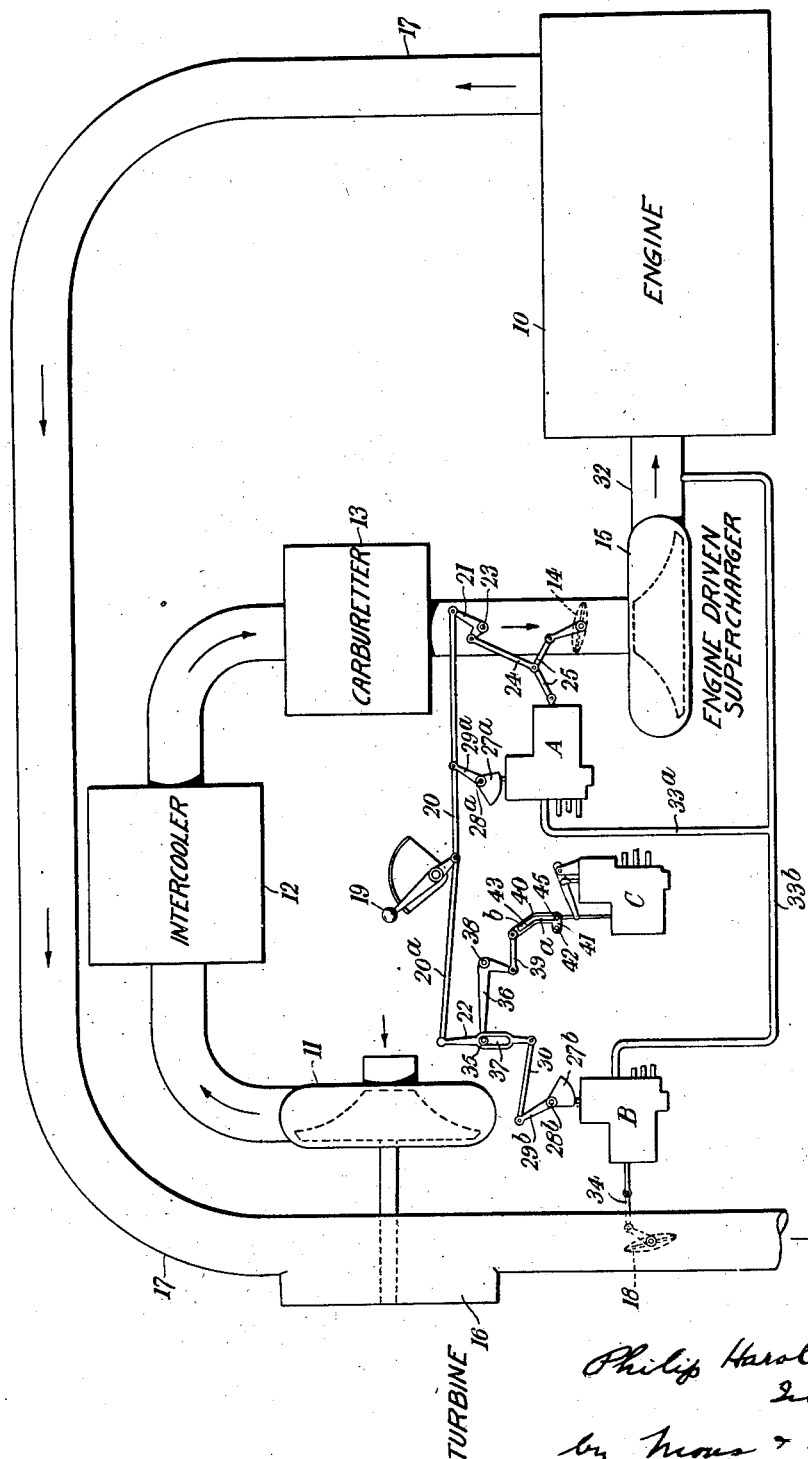

Aug. 15, 1944.     P. H. STOKES     2,355,759
EXHAUST-DRIVEN TURBO SUPERCHARGER FOR INTERNAL-COMBUSTION ENGINES
Filed Jan. 14, 1943     3 Sheets-Sheet 1

Philip Harold Stokes
Inventor
by Mone & Holte
his attorneys

Aug. 15, 1944.   P. H. STOKES   2,355,759
EXHAUST-DRIVEN TURBO SUPERCHARGER FOR INTERNAL-COMBUSTION ENGINES
Filed Jan. 14, 1943   3 Sheets-Sheet 2

Philip Harold Stokes
Inventor
by Moses & Nolte
his attorneys

Aug. 15, 1944. P. H. STOKES 2,355,759
EXHAUST-DRIVEN TURBO SUPERCHARGER FOR INTERNAL-COMBUSTION ENGINES
Filed Jan. 14, 1943 3 Sheets-Sheet 3

Philip Harold Stokes,
Inventor,
by Moss & Nolte
his attorneys

Patented Aug. 15, 1944

2,355,759

UNITED STATES PATENT OFFICE 2,355,759

EXHAUST-DRIVEN TURBOSUPERCHARGER FOR INTERNAL-COMBUSTION ENGINES

Philip Harold Stokes, Stratford-on-Avon, England, assignor to H. M. Hobson (Aircraft & Motor) Components Limited, Bridgewater, Somerset, England Application January 14, 1943, Serial No. 472,319½
In Great Britain February 10, 1942

7 Claims. (Cl. 60—13)

With aircraft engines fitted with exhaust driven turbo-superchargers, as height is gained and the supercharger pressure maintained, the decrease in the air pressure against the outlet of the exhaust system causes the speed of the turbine to increase due to the increasing pressure difference across it. This is of course an advantage in that it enables the supercharger, as the altitude increases, to deliver a greater volume of air to the engine and so to compensate for the decreasing density of the air. There comes a limit however beyond which the speed of revolution of the turbine becomes excessive and likely to cause the structure to fail. It is an object of the present invention to prevent the development of such excessive speeds at high altitudes.

The invention accordingly provides, in combination with an aircraft engine and a supercharger driven by an exhaust-gas-operated turbine, an altitude-responsive device which is inoperative while the altitude is below a predetermined critical limit, but is automatically effective to prevent further increase in the speed of the turbine as the altitude increases beyond said critical limit. In place of a turbine we may employ equivalent exhaust-gas-operated prime movers for driving the supercharger and the expression "turbine" in the appended claims is to be construed as covering broadly any exhaust-gas-operated prime mover, suitable for use on aircraft.

Thus the altitude-responsive device may be arranged to diminish progressively the quantity of exhaust gas supplied to the turbine as the altitude increases beyond the critical limit.

In one arrangement according to the invention, the flow of exhaust gas to the turbine is controlled by a valve coupled to a boost control device (preferably of the variable datum type) which, so long as the altitude remains below the critical limit, operates the valve so as to prevent the development of excessive induction pipe pressures while progressively increasing the quantity of exhaust gas supplied to the turbine as the altitude increases. The altitude-responsive device is arranged to override the boost control device when the critical altitude is reached and thereafter actuates the valve to diminish progressively the quantity of exhaust gas supplied to the turbine on further increase in altitude.

In the preferred form of the invention, an engine-driven supercharger is also provided, this being associated with another boost control device, preferably also of the variable datum type. The two boost control devices are operated by a single pilot's throttle lever, and are set so that up to a given altitude (hereinafter referred to as the rated height) the engine-driven supercharger only is effective. When the aircraft reaches an altitude such that the engine-driven supercharger can no longer maintain the required boost, the boost control device associated with the turbine comes automatically into operation and begins to admit exhaust gas to the turbine. The turbo-driven supercharger then begins to assist the engine-driven supercharger to produce the required boost pressure. As the altitude further increases, more and more exhaust gas is admitted to the turbine until the aircraft reaches the critical altitude at which the turbo-supercharger has reached its maximum allowable speed of rotation. As the altitude increases beyond this limit, the altitude-responsive device automatically takes over and thereafter diminishes the quantity of exhaust gas supplied to the turbine and so prevents further increase in its speed of rotation. Automatic regulation of engine performance on a turbo-supercharger installation, controllable by a single pilot's throttle lever at all heights at which the aircraft can be flown, is thus obtained.

One form of automatic control device according to the invention will now be described in further detail by way of example, with reference to the accompanying drawings, in which—

Figure 2:
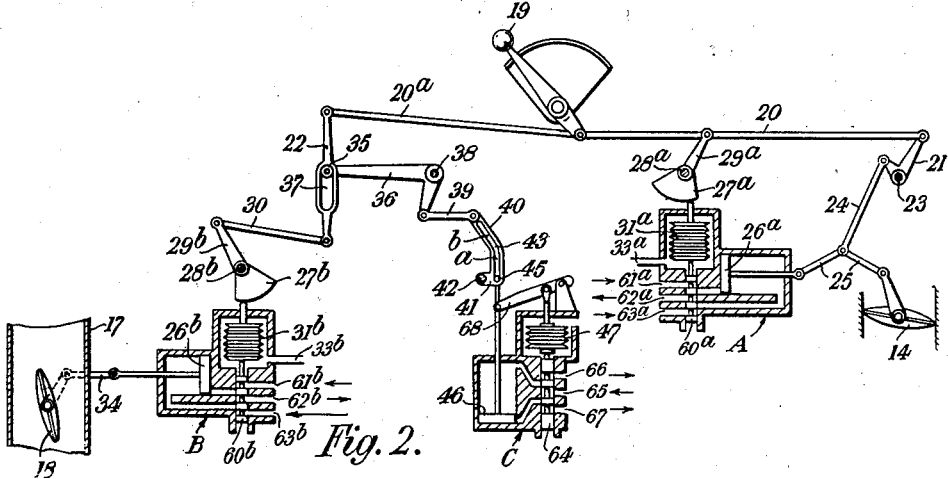
Figure 3:
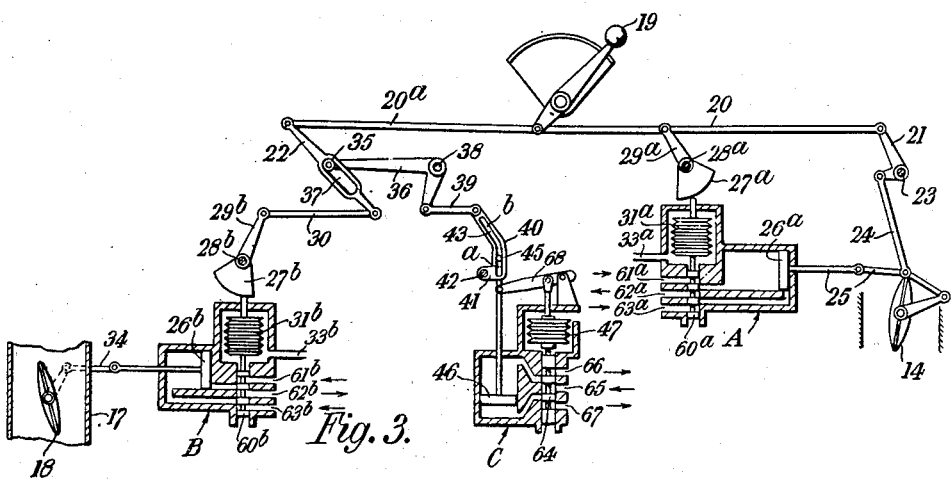
Figure 4:
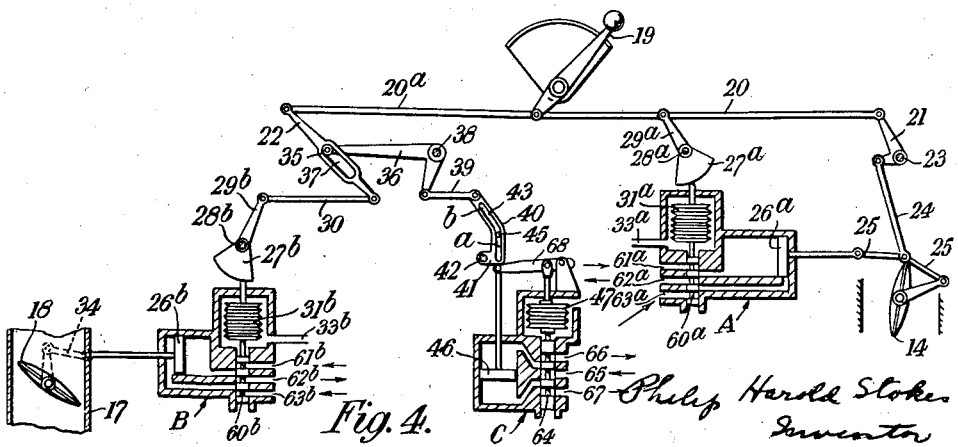
Figure 5:
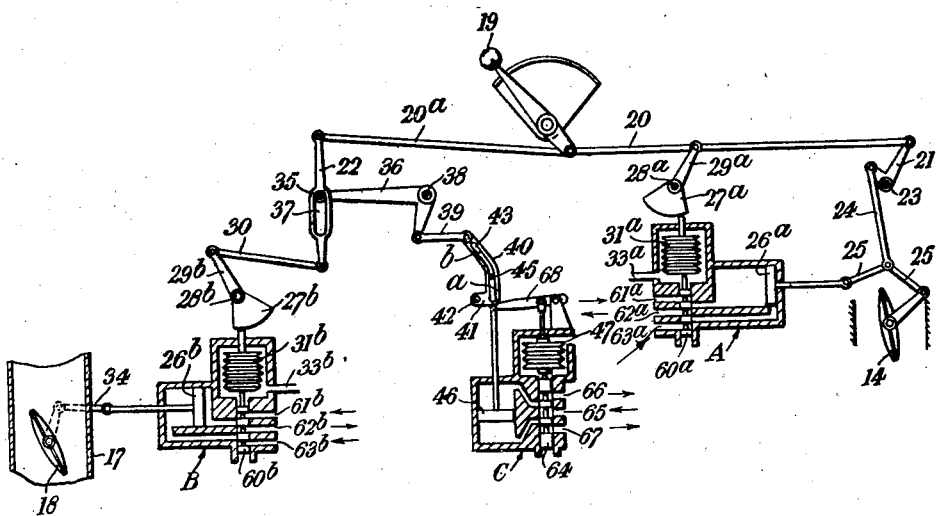
Figure 6:
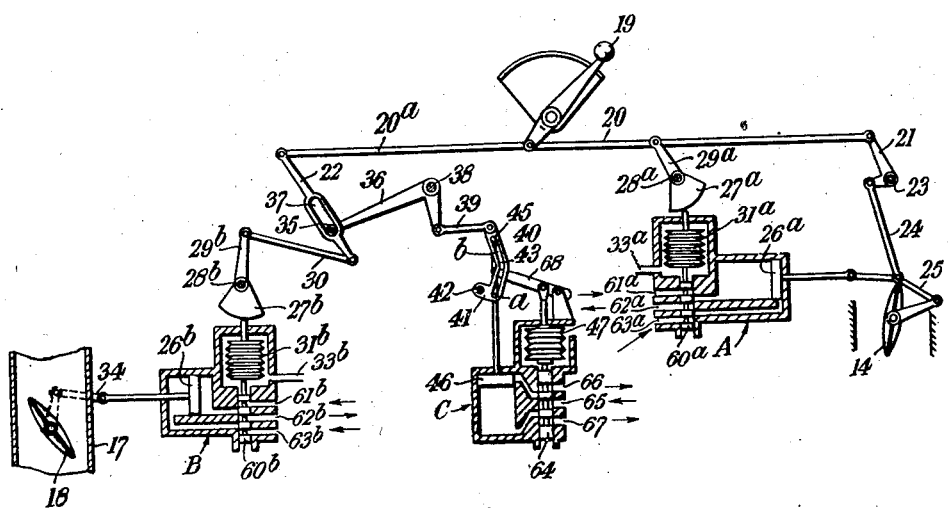

Fig. 1 is a diagrammatic view of the complete installation, showing the pilot's lever in the slow running position and the throttle valve closed at ground level, Fig. 2 is an enlarged view of the boost control devices, associated valves, altitude-responsive device, and throttle-lever-operated linkage with the parts in the position shown in Fig. 1, Fig. 3 is a similar view showing the parts in the position they occupy at the rated height with the pilot's lever in the full throttle position, Fig. 4 is a similar view between the rated height and the critical height, with the pilot's lever in the full throttle position, Fig. 5 is a similar view showing the effect of moving the pilot's lever to the slow running position from the position of Fig. 4, and Fig. 6 is a similar view showing the parts above the critical height and with the pilot's lever in the full throttle position.

The air admitted to the engine 10 passes, as indicated by the arrows, first through an exhaust driven turbo-supercharger 11, then through an intercooler 12, then through the carburetter 13, then past the throttle valve 14 and finally through an engine driven supercharger 15. The exhaust gas traverses the turbine 16 which is placed to one side of the exhaust pipe 17. A gate valve 18, hereinafter referred to as the waste gate, located in the exhaust pipe 17 beyond the turbine 16 controls the quantity of exhaust gas supplied to the turbine. When the waste gate 18 is open, all of the exhaust gas is spilled through it and none traverses the turbine, and as the waste gate is gradually closed, more and more exhaust gas is fed to the turbine.

The usual method of operating a turbo-supercharger installation of this kind is to open fully the waste gate at ground level, and to open the throttle valve until the desired boost pressure at the entry to the engine is obtained. As height is increased the throttle valve is progressively opened to maintain the desired boost until full throttle conditions are reached at the carburetter. As height is increased beyond this point, it is necessary to close the waste gate progressively and so maintain the boost pressure by increasing the speed of the turbo-driven supercharger. This is achieved automatically by my system under the control of a single pilot's throttle lever 19 as described below.

To the lower end of the pilot's throttle lever 19 are connected links 20, 20ª, pivoted respectively to a bell crank 21 and to a slotted link 22. The bell crank 21 turns on a fixed pivot 23, and its other end is coupled by a link 24 to a broken link 25, forming a connection between the servo piston 26ª of a variable datum boost control device A and the throttle valve 14. The controlling cam 27ª of the boost control device A is pivoted on a pin 28ª and operated by a lever 29ª fixed to the cam and pivoted to the link 20. The controlling cam 27ᵇ of a second variable datum boost control device B is pivoted on a pin 28ᵇ and operated by a lever 29ᵇ connected by a link 30 to the slotted link 22. The construction of the variable datum boost control device is fully described in United States Patent No. 1,998,362.

It will be sufficient here to state that, starting from the position shown in Fig. 2, a fall in boost pressure due to an increase in altitude causes the capsules 31ª of boost control device A to expand, thus moving a relay valve 60ª down and admitting pressure oil through an inlet port 61ª to the left hand side of the servo piston 26ª, which thereupon moves to the right, displacing oil to exhaust through port 62ª and opening the throttle valve 14. This movement continues until the boost pressure returns to the predetermined value corresponding to the datum of the boost control device, whereupon the capsules 31ª return the relay valve 60ª to the neutral position shown in the figure.

Movement of the pilot's lever 19 to the right from the position shown in Fig. 2 causes the cam 27ª to alter the datum of the capsules 31ª so that they maintain a higher boost pressure, thus operating on the relay valve 60ª and servo piston 26ª to open the throttle valve 14 until the boost pressure rises to the value determined by the new datum of the boost control device.

Should the boost pressure rise above the value determined by the variable datum cam 27ª, the capsules will be compressed raising the relay valve 60ª and so admitting pressure oil through a port 63ª to the right hand side of the servo piston 26ª which then moves to the right, displacing oil to exhaust through port 62ª and closing the throttle valve 14 until the boost pressure has fallen to the required value.

The boost control device B is of similar construction, and similar parts are similarly referenced.

The capsules 31ª, 31ᵇ of the boost control devices are subjected to the pressure prevailing in the induction pipe 32 by connections indicated diagrammatically at 33ª, 33ᵇ, see Fig. 1. The servo piston 26ª of the boost control device A operates the throttle valve 14 through the agency of the broken link 25 as already described, the shape of the controlling cam 27ª determining the relationship between the position of the pilot's lever 19 and the boost pressure developed. The action of the broken link 25 is such that when the pilot's lever 19 is moved from the slow running position, the carburetter throttle is manually opened by a predetermined amount and this is followed by servo opening until the required boost pressure is obtained. Similarly, when closing the throttle, the initial motion is manual, through the linkage, followed by servo closing.

The servo piston 26ᵇ of the boost control device B is connected by a link 34 to the waste gate 18, and its controlling cam 27ᵇ is similar to that of the boost control device A but set with a small lag, say ⅛ lb./sq. in. boost pressure.

Under these conditions any given position of the pilot's lever 19 will call for a slightly higher boost from boost control device A, than from boost control device B, with the result that boost control device B will remain inoperative, and the waste gate 18 will remain open, as shown in Figs. 2 and 3, until the throttle valve 14 is fully open and the position of the pilot's lever 19 corresponds to a boost pressure higher than can be obtained from the engine-driven supercharger alone.

When the rated height is reached, the throttle valve 14 becomes fully open (see Fig. 3), but above this height the engine-driven supercharger 15 alone is incapable of maintaining the required boost. The boost control device B will then come into operation and close the waste gate 18 of the exhaust gas turbine 16 (see Fig. 4), until sufficient output is obtained from the turbo-supercharger 11 to produce, in conjunction with the engine driven supercharger 15, the required boost pressure. This boost pressure will be slightly less, say ⅛ lb./sq. in., than that which would have been obtained with the pilot's lever in the same position at a lower altitude with the boost control device A and the throttle valve 19 in operation only, the difference representing the slight lead given to boost control device A, but apart from the very small dead period entailed by this reduction in boost, the change-over from one supercharger to two superchargers will be smooth and will occur automatically at whatever altitude the carburetter throttle becomes fully open in maintaining the boost pressure called for by the position of the pilot's lever 19.

The broken link 25 is so arranged that, with the servo piston 26ª of the boost control device A in its fully extended position, and the pilot's lever 19 in the full throttle position, the throttle valve 14 instead of occupying the true central or fully open position has actually moved somewhat (say 10°) beyond that position (see Fig. 3). This small excess movement will not however appreciably affect the airflow across it. The broken link 25 is also so designed that, if the pilot's lever 19 is now moved to the slow running position (Fig. 5), the effect is to move the throttle valve 14 into a similarly disposed position in relation to the central position, i. e., approximately 10° from the central position towards the closed position.

When at any heights above the rated height the pilot's lever 19 is moved towards the closed position to reduce boost pressure, then the cam controlling the boost control device B will be rotated to open the waste gate 18 accordingly (see Fig. 5 in comparison with Fig. 4). At the same time, the throttle valve 14 will be rotated towards its closed position through the broken link, but as the angular movement of the throttle valve will be relatively small (at the most it would be of the order of ±10° about dead centre), it will not be sufficient materially to effect the airflow across it, and there will be, therefore, no build-up of air pressure between the two superchargers.

The condition that above the critical altitude the boost pressure must be reduced by spilling exhaust gas in order to keep the speed of the turbine 16 within the maximum allowable limit is satisfied by the slotted link 22 in the linkage connecting the pilot's lever 19 with the cam 27ᵇ of the boost control device B. A roller 35 carried by a bell crank 36 is received within the slot 37 in the slotted link 22. The link 22 pivots about the roller 35 when communicating movement from the pilot's lever 19 to the cam 27ᵇ of the boost control device B. Angular movement of the bell crank 36 about its pivot 38 will therefore, by displacing the roller 35 in relation to the slot 37, vary the movement communicated to the cam 27ᵇ of the boost control device B by angular movement of the pilot's lever 19. The bell crank 36 is connected by a link 39 to a slotted link 40 which is formed with an offset portion 41 mounted on a fixed pivot 42. In the slot 43 of the slotted link 40 is received a roller 45 connected to the servo piston 46 of an altitude responsive device C. This includes a bellows 47 arranged to vary the position of the servo piston 46 in accordance with changes in altitude.

The bellows 47 is connected to a relay valve 64 controlling an oil pressure inlet port 65 and exhaust ports 66, 67. On increase in altitude the bellows 47 expands, lifting the relay valve 64 and supplying pressure to the underside of the piston which then rises, displacing oil to exhaust through port 66, until a follow-up gear 68 returns the relay valve 64 to the neutral position. Similarly, if the altitude decreases, the relay valve 64 is moved down, admitting pressure to the top of the servo piston 46. This moves down, displacing oil to exhaust through port 67 until the follow-up gear 68 again returns the relay valve 64 to the neutral position. The position of the servo piston 46 in its cylinder is therefore always a function of altitude.

Movement of the roller 45 is accordingly also a function of the altitude and the shape of the slot 43 in the slotted bell crank accordingly determines the position of the other roller 35 in relation to the slotted link 22.

The lower portion a of the slot 43 in the link 40 is straight and normally extends in the line of movement of the servo piston 46, and the upper portion b is inclined to the straight. So long therefore as the altitude remains below the limit at which the roller 45 enters the inclined portion b of the slot, the altitude responsive device will be ineffective. When the critical altitude is reached however the roller 45 moves into the inclined portion b of the slot, rocking the link 40 clockwise about its pivot 42 and, through the agency of the bell crank 36, the other roller 35 and the slotted link 22 resetting the cam of the boost control device B in the sense to reopen the waste gate 18 (see Fig. 6). The slot 43 in the link 40 is so shaped that this action is progressive, the waste gate 18 being opened more and more as the altitude is increased beyond the critical altitude. In this way the quantity of exhaust gas admitted to the turbine 16 is progressively decreased as the altitude increases beyond the critical altitude so that the speed of rotation of the turbine is prevented from increasing beyond the limiting value corresponding to the critical altitude.

What I claim as my invention and desire to secure by Letters Patent is:

1. In an aircraft engine installation of the type having an engine-driven supercharger, and a turbo-driven supercharger provided with a turbine driven by exhaust gas from the engine, the combination, with a throttle valve of the engine and a valve for controlling the supply of exhaust gas to the turbine, of two boost control devices, each comprising a servo mechanism and a member sensitive to boost pressure for operating said servo mechanism, one of said boost control devices including means operated from its servo mechanism for controlling the position of the throttle valve, the other boost control device including means operated from the other servo mechanism for controlling the position of the exhaust gas valve, means rendering said other servo mechanism effective to supply exhaust gas to the turbine only when rated height is exceeded, and an altitude-responsive device operative, at a predetermined critical height, to override the latter servo mechanism and so prevent overspeeding of the turbine.

2. In an aircraft engine installation of the type having an engine-driven supercharger, and a turbo-driven supercharger provided with a turbine driven by exhaust gas from the engine, the combination, with a throttle valve of the engine and a valve for controlling the supply of exhaust gas to the turbine, of two boost control devices, each comprising a servo mechanism and a member sensitive to boost pressure for operating said servo mechanism, one of said boost control devices including means operated from its servo mechanism for controlling the position of the throttle valve, the other boost control device including means operated from the other servo mechanism for controlling the position of the exhaust gas valve, means rendering said other servo mechanism effective to supply exhaust gas to the turbine only when rated height is exceeded, a pilot's control lever, a linkage connected thereto, a pair of cams operated by said linkage for varying respectively the datum of the boost control devices in the sense to increase the boost pressure as the pilot's control lever is moved towards an open throttle position, the cam of the boost control device associated with the exhaust gas valve maintaining said boost control device inoperative, and so preventing operation of the exhaust gas turbine, below rated height, and an altitude-responsive device operative at a predetermined critical height to actuate said cam through the agency of said linkage in the sense to reduce the supply of exhaust gas to the turbine.

3. Apparatus as claimed in claim 2, wherein the linkage between the pilot's throttle lever and the cam of the boost control device associated with the exhaust gas valve includes a normally stationary pivot, and wherein there is provided a connection between said pivot and the altitude-responsive device for displacing the pivot, when the critical altitude is exceeded, to reset the cam in the sense to decrease the supply of exhaust gas to the turbine.

4. Apparatus as claimed in claim 2, comprising a slotted link constituting part of the linkage between the pilot's control lever and the cam of the boost control device associated with the exhaust gas valve, a first pin engaging in said slotted link and constituting a fulcrum for said linkage, a normally stationary second linkage connected to said pin, said second linkage including a second slotted link the slot of which has a straight portion and an inclined portion, a second pin engaging in said two-part slot, and a servo mechanism controlled by the altitude-responsive device and serving to position the pin in relation to the two-part slot, movement of said pin along the straight portion of the slot being ineffective on said second linkage, but movement of said pin into the inclined portion of the slot operating said second linkage, and thereby actuating the cam, through the agency of the first pin and first slotted link, to reduce the supply of exhaust gas to the turbine.

5. In an aircraft engine installation of the type having an engine-driven supercharger and a turbo-driven supercharger with a turbine driven by exhaust gas from the engine, the combination, with a throttle valve in the induction pipe of the engine and a valve for controlling the supply of exhaust gas to the turbine, of a pair of boost control devices, each comprising a servo mechanism and a member sensitive to boost pressure for operating said servo mechanism, one of said boost control devices including means operated from its servo mechanism for controlling the position of the throttle valve, the other boost control device including means operated from the other servo mechanism for controlling the position of the exhaust gas valve, a pilot's control lever, datum-changing means associated therewith for changing the datum of each boost control device in the sense to increase the boost pressure on movement of the pilot's control lever towards an open throttle position, said datum changing means including means rendering ineffective below rated height the boost control device associated with the exhaust gas valve, but rendering said boost control device automatically effective above rated height to feed exhaust gas to the turbine, and an altitude-responsive device operative, at a predetermined critical height, to decrease the flow of exhaust gas to the turbine progressively with further increase in altitude.

6. Apparatus as claimed in claim 5, comprising a linkage interconnecting the pilot's control lever, the throttle valve and the servo mechanism associated with the throttle valve, and including means effective above rated height for moving the throttle valve only through a small angle from one side to the other of its dead centre position in the induction pipe, on full movement of the pilot's throttle control between its slow running and its full throttle position.

7. Apparatus as claimed in claim 5, comprising a broken link connected at its ends to the throttle valve and to the associated servo mechanism, and a linkage connecting the centre point of the broken link with the pilot's control lever, said linkage including means for effecting, above rated height, a small angular movement of the throttle valve about its dead centre position in the induction pipe, on movement of the pilot's control lever through its full range of movement.

PHILIP HAROLD STOKES.